United States Patent
Svanoe

[15] 3,644,102
[45] Feb. 22, 1972

[54] CRYSTALLIZATION OF POTASSIUM CHLORIDE FROM CARNALLITE DECOMPOSITION

[72] Inventor: Hans Svanoe, Warren, Pa.
[73] Assignee: Struthers Scientific and International Corporation
[22] Filed: Nov. 30, 1967
[21] Appl. No.: 686,826

[30] Foreign Application Priority Data
Dec. 1, 1966 Great Britain......................53,867/66

[52] U.S. Cl. ...............................23/298, 23/302, 23/301 R
[51] Int. Cl. .........................................B01d 9/02, C01d 3/08
[58] Field of Search.................23/312 AH, 296, 301 L, 302, 23/298, 38

[56] References Cited

UNITED STATES PATENTS

| | | | |
|---|---|---|---|
| 1,305,566 | 6/1919 | Reeve | 23/38 |
| 2,479,001 | 8/1949 | Burke et al. | 23/298 |
| 3,323,875 | 6/1967 | Been | 23/312 |
| 3,440,023 | 4/1969 | Hoppe et al. | 23/301 |
| 3,442,553 | 5/1969 | Kutz | 23/38 |

*Primary Examiner*—Norman Yudkoff
*Assistant Examiner*—R. T. Foster
*Attorney*—William A. Drucker

[57] ABSTRACT

Carnallite is decomposed by adding it to water under optimum conditions so that potassium chloride may be crystallized therefrom using potassium chloride seed crystals of over 60 mesh size.

3 Claims, No Drawings

CRYSTALLIZATION OF POTASSIUM CHLORIDE FROM CARNALLITE DECOMPOSITION

The composition of carnallite, as a raw material extracted from nature, varies from one source to another depending on the impurities associated with the hydrated chloride of potassium and magnesium. This invention relates to the separation of potassium chloride from carnallite.

Potassium chloride separated from carnallite has many uses in industry and as a fertilizer.

It is, therefore, a main object of this invention to provide a more efficient and lower cost process for the decomposition of carnallite to produce potassium chloride.

Other objects, advantages, and features of invention reside in the particular steps, conditions, and limitations involved in the processes of this invention as will be understood from the following description.

Carnallite will decompose upon the addition of water. One sample of carnallite to be decomposed in water had the following composition.

| | |
|---|---|
| $MgCl_2$ | 100 mols |
| KCl | 123 mols or 61.5 mols $K_2Cl_2$ |
| NaCl | 128 mols or 64.0 mols $Na_2Cl$ |
| $H_2O$ | 600 mols |
| $CaSO_4$ | 2.9% by weight in solution |

Note: There were 23 mols of KCl present as such in addition to that in the carnallite.

The decomposition of this carnallite could take place stepwise as water was progressively added to it. In this case, the initial decomposition of the carnallite would take place at a relatively low $MgCl_2$ content. The last step would then be carried out just on the KCl side of the carnallite-KCl field. However, if carnallite is decomposed in such a stepwise or series operation, quite large quantities of NaCl will be dissolved at the lower $MgCl_2$ concentrations. The bulk of this NaCl will crystallize together with the KCL in the steps which follow. In fact, at the later higher $MgCl_2$ concentrations, the solution will be relatively more saturated with NaCl than KCl. It is for this reason that it is very difficult, in this case, to prevent NaCl from crystallizing on the KCl.

The entire decomposition can also take place at the KCl side of the carnallite-KCl field. However, to decompose carnallite a good distance from the carnallite field means that there must be a high supersaturation of the KCL which thus tends to produce the formation of many small KCl crystals which are difficult and expensive to separate from the mother liquor.

For the foregoing reasons, decomposition should be carried out close to the carnallite equilibrium point to provide larger crystals of KCl with as little NaCl as possible crystallized on them.

To carry out the decomposition of carnallite according to this invention, a mother liquor having the following characteristics is provided:

per 1,000 mols of $H_2O$:
 70 mols of $MgCl_2$
 5.7 mols of $K_2Cl_2$
 4.0 mols of $Na_2Cl_2$ To the mother liquor of the above composition at a temperature of 25° C., both NaCl and KCl are added in the solid state as a suspension. The composition of the above mother liquor then becomes:

per 1,000 mols $H_2O$:
 69 mols $MgCl_2$ in solution
 5.8 mols $K_2Cl_2$ in solution +37.6 mols $K_2Cl_2$ in suspension to total 42.5 mols $K_2Cl_2$
 4.2 mols $Na_2Cl_2$ in solution +39.9 mols $Na_2Cl_2$ in suspension to total 44.1 mols $Na_2Cl_2$ The suspension density of KCl must be adjusted to a value of at least six times the hourly rate of production of KCl in suspension. As an example, if 2 pounds of KCl are produced per hour of a given operation, the KCl in suspension should not be less than 12 pounds. In one test operation, the production of each 2 pounds of KCl had from 12 to 20 pounds of KCl in suspension. An even greater proportion of KCl in suspension may be preferable.

When decomposing carnallite in a mother liquor close to the carnallite-KCl field at 25° C., the mother liquor contains, as explained above, 4.2 mols $Na_2Cl_2$ in solution per 1,000 mols $H_2O$ of the water added. Since the added water dissolves $Na_2Cl_2$ to this extent, less NaCl will crystallize out.

The material balance on a mol basis is diagrammed below:

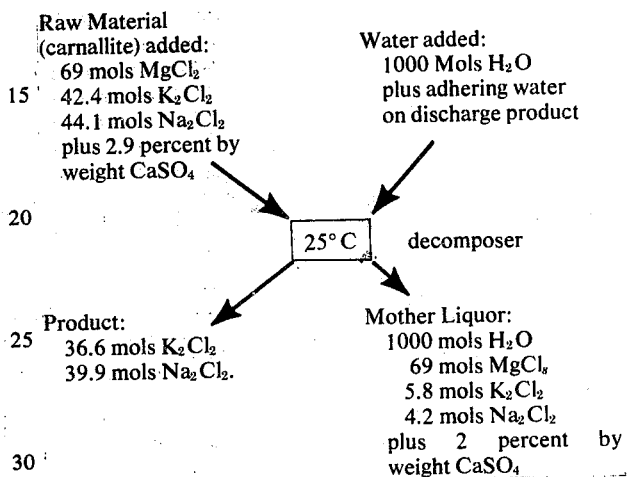

Raw Material (carnallite) added:
 69 mols $MgCl_2$
 42.4 mols $K_2Cl_2$
 44.1 mols $Na_2Cl_2$
 plus 2.9 percent by weight $CaSO_4$ Water added:
 1000 Mols $H_2O$
 plus adhering water on discharge product Product:
 36.6 mols $K_2Cl_2$
 39.9 mols $Na_2Cl_2$ Mother Liquor:
 1000 mols $H_2O$
 69 mols $MgCl_2$
 5.8 mols $K_2Cl_2$
 4.2 mols $Na_2Cl_2$
 plus 2 percent by weight $CaSO_4$ It is to be noted that the temperature of 25° C. may be maintained by direct or indirect contact with steam. This steam may be waste heat from evaporated vapor from the product. However, since there is a high heat of crystallization of KCl, very little heat may be required.

The mother liquor drawn off from the above decomposer may be concentrated by evaporation at 50° C. up to the $MgCl_2 \cdot 6H_2O$ field.

This provides the following.
 910 mols $H_2O$
 100 mols $MgCl_2$ (not in carnallite)
 2.2 mols carnallite
 0.46 mols $Na_2Cl_2$ The crystals of carnallite and NaCl thus produced may be reintroduced into the decomposer to increase the recovery of KCl. It is to be noted that a small quantity of the $CaSO_4$ may be precipitated during this concentration. In the filters or centrifuges used to remove the carnallite after the concentration, the temperature must be maintained at over 50° C. or $MgCl_2 \cdot 6H_2O$ will start to crystallize. Thus the lower limit for the operating temperatures of these devices must be as high as that at which the concentration was carried out.

In the decomposition of carnallite with water to produce crystalline KCl and a $MgCl_2$ solution, two reactions take place concurrently. These are as follows:

(1) $MgCl_2 \cdot KCl \cdot 6H_2O + H_2O = \dfrac{KCl}{\text{SUPERSATURATED}} + \dfrac{MgCl_2}{\text{IN SOLUTION}}$ (2) KCl supersaturated ............ deposited on crystals of KCl in suspension When the above reactions take place in the presence of NaCl crystals, it is best to operate under conditions where NaCl is not crystallized together with the KCl.

The above reactions should take place at about the same rate. If reaction (1) is faster than reaction (2), the supersaturation of KCl will become so great that excessive nucleation will take place. This will produce small crystals of KCl which are more difficult to separate. Thus the production of fine KCL crystals indicates that, under given conditions, reaction (1) should be slowed down. Some production of fine KCl crystals is tolerable as these fine crystals may be dissolved in the water that is added to the decomposer tank. A suspension of KCl crystals of a desired size, larger crystals than 60 mesh size, in the mother liquor will provide a base for the supersaturated KCl to be deposited upon in reaction (2). This will provide large crystals of KCl in the product for easier separation.

In some cases, small crystals of carnallite may carry over from the last stages of decomposition to the centrifuges of filters used to recover the product. This can be prevented by a slight heating of the crystals slurry which will redissolve the carnallite crystals to be withdrawn with the mother liquor.

In summation this invention contemplates the process of the decomposition of carnallite to produce potassium chloride comprising the steps of adding carnallite and water to a mother liquor being at least partially a saturated solution of potassium chloride and carnallite, the mother liquor containing crystals of potassium chloride of over 60 mesh size as a suspension, the suspension amounting to at least six times the hourly rate of production of potassium chloride crystals from decomposition of carnallite in the mother liquor, the decomposition taking place close to the equilibrium point of carnallite, in the solution, the decomposition taking place at about 25° C., crystallizing potassium chloride on the crystals in suspension in the mother liquor, and separation potassium chloride crystals from the mother liquor.

This invention further contemplates the additional steps of concentrating the mother liquor from which the potassium chloride crystals are separated at about 50° C. to crystallize carnallite in the mother liquor, and separating the crystallized carnallite from the mother liquor.

What is claimed is:

1. In the process of the decomposition or carnallite to product potassium chloride, the steps of:
   a. providing a mother Liquor of saturated aqueous solution of potassium chloride which also contains carnallite,
   b. introducing into the mother liquor, crystals of potassium chloride of over 60 mesh size as a suspension, to form nucleating crystals remaining in suspension amounting to at least six times the hourly rate of production of potassium chloride crystals from this process,
   c. adding carnallite and water to the mother liquor so that the carnallite decomposes in the mother liquor close to the equilibrium point of carnallite in the resulting mother liquor,
   d. crystallizing potassium chloride on the said crystals in suspension in the mother liquor avoiding excessive nucleation of the potassium chloride, and
   e. separating potassium chloride crystals from the mother liquor.

2. The process according to claim 1 wherein carnallite is decomposed by water in the mother liquor maintained at a temperature of about 25° C.

3. The process according to claim 2 with the additional steps of:
   f. concentrating by evaporation at about 50° C. the mother liquor from which the potassium chloride crystals are separated to grow carnallite crystals therein; and
   g. separating the crystallized carnallite from the concentrated mother liquor for recycling into the process in step (c) above.

* * * * *